INVENTORS
RUDOLPH A. HANSON
EDWARD J. ZIEGLER
JOHN E. FISCHER

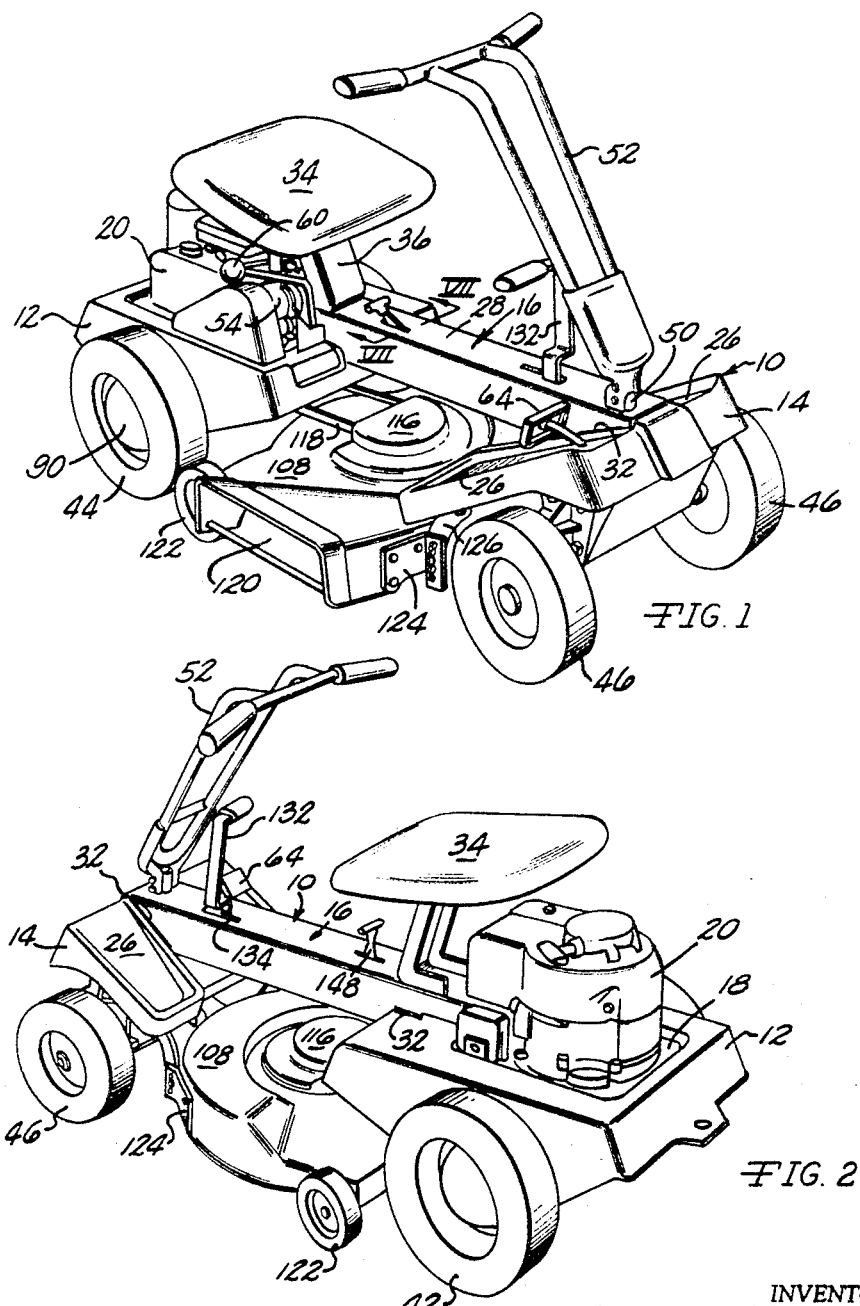

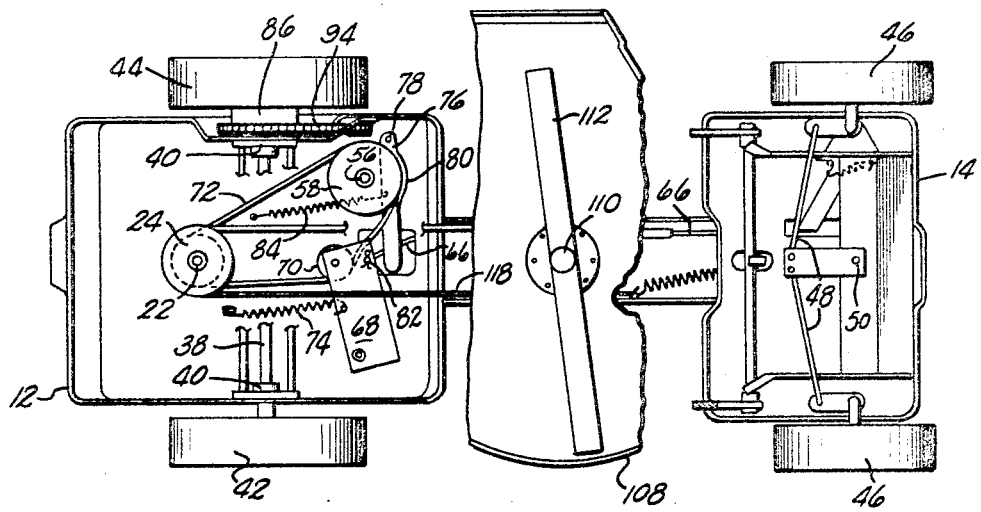
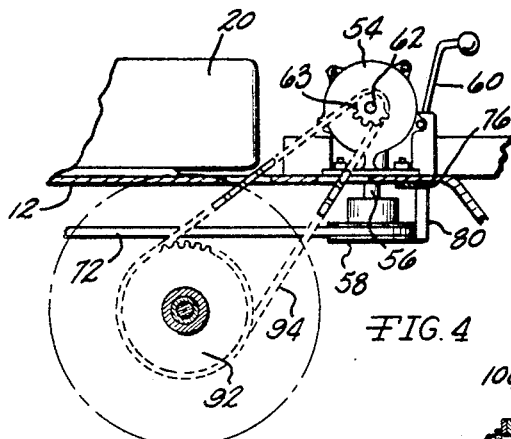
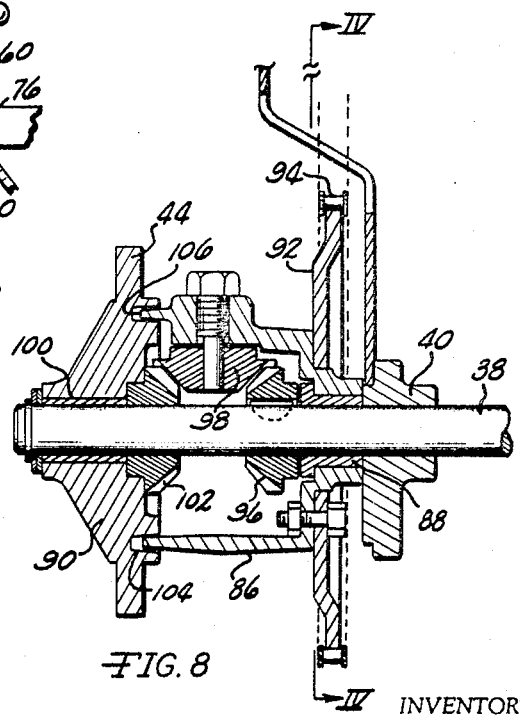
INVENTORS
RUDOLPH A. HANSON
EDWARD J. ZIEGLER
JOHN E. FISCHER
BY Beaman Beaman
ATTORNEYS Sept. 16, 1969  R. A. HANSON ET AL  3,466,855
RIDING LAWN MOWER Filed May 23, 1966  3 Sheets-Sheet 3

BY Beaman Beaman
ATTORNEYS

United States Patent Office 3,466,855
Patented Sept. 16, 1969

3,466,855
RIDING LAWN MOWER
Rudolph A. Hanson, Edward J. Ziegler, and John E. Fischer, Jackson, Mich., assignors to Yard-Man, Inc., Jackson, Mich., a corporation of Michigan
Filed May 23, 1966, Ser. No. 552,012
Int. Cl. A01d 35/26, 35/12, 35/00
U.S. Cl. 56—25.4                                   5 Claims

ABSTRACT OF THE DISCLOSURE

A riding lawn mower consisting of front and rear wheel supported portions interconnected by a relatively narrow elongated torsion member rigidly affixed thereto wherein vertical tilting of the axes of the wheels mounted upon the front end rear portion may occur to accommodate uneven terrain due to flexing of the torsion member portion of the frame.

---

Figure 5:
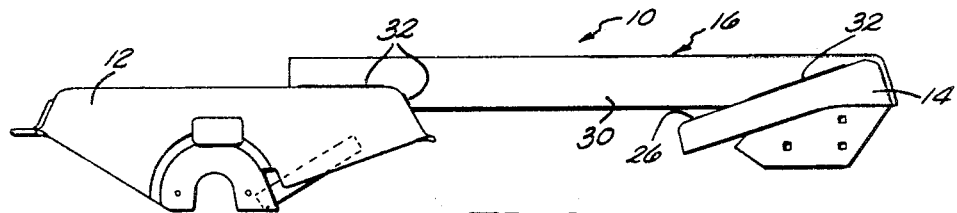

Lawn mowers of the rotary type wherein cutting is produced by a blade rapidly rotating in a horizontal plane often tend to "scalp" the grass where the terrain is uneven and the mower and mower housing tend to tilt with respect to the terrain. Such "scalping" usually occurs when a relatively abrupt vertical change takes place in the terrain wherein the wheels supporting the blade and blade housing are not able to follow the terrain contour. Various solutions have been proposed to minimize such "scalping," such as placing the blade supporting wheels as closely as possible to the blade, or placing a support member directly below the blade.

In a riding lawn mower wherein the operator is supported upon a self-propelled vehicle it is necessary that the primary mower supporting wheels be spaced apart a sufficient distance to produce a stable vehicle. As the blade and blade housing are usually mounted upon the mower frame and, thus, supported by the primary wheels, the tendency for riding lawn mower to "scalp" is particularly troublesome. One attempt to minimize such adverse cutting characteristics has been to at least partially support the blade housing directly upon its own small wheels, such as shown in United States Patent 2,924,928. However, as the blade housing is transported by the mower it is common to support at least half of the blade housing upon the mower and, thus, support a portion of the blade housing by the primary supporting wheels of the mower. In a mower having a rigid frame, minor variations in the terrain are not sensed by the mower due to the frame rigidity. Thus, assuming the blade housing to be attached to the mower front portion, a variation in the terrain which might tend to cause the mower front wheels to tilt in a vertical plane with respect to the rear mower wheels causes the front wheel axis to raise in that a four-wheeled mower can momentarily be supported upon three wheels. Thus, a rigid frame mower will produce uneven cutting characteristics over uneven terrain.

In order to overcome the aforementioned adverse cutting characteristics occurring in a rigid frame mower, the applicants have provided a riding lawn mower having a frame including front and rear portions interconnected by an elongated central portion which is capable of flexing, to a limited degree, about its longitudinal axis. Thus, with the mower of the invention it is possible to tilt or pivot the front portion of the mower in a vertical plane relative to the back portion and vice versa. The blade housing is affixed to the front frame portion and upon the front wheels engaging a terrain condition which tends to raise one of the front wheels to a greater extent than the other front wheel the mower frame is able to accommodate itself to such terrain and transmit such terrain changes to the blade housing supported thereon and thereby minimize "scalping" and other variations in the height of the cut. Also, such flexing of the frame central portion prevents irregularities in the terrain, encountered by the rear wheels of the mower, over which the blade has already passed, from being transmitted to the frame front portion, and blade housing.

In the practice of the invention such flexing of the mower frame is possible due to the sheet metal construction of the elongated frame central portion which is preferably of an inverted channel and is rigidly affixed at its ends to the front and rear frame portions. Thus, an integral and rugged riding mower frame is produced, yet flexing or twisting of the frame, within a limited degree, is possible.

It is, therefore, an object of the invention to provide a lawn mower having a frame including front and rear portions wherein an integral construction is utilized, yet relative flexing in vertically disposed planes is possible between the front and rear mower portions.

Another object of the invention is to provide a rotary lawn mower upon which the operator may be supported wherein superior and uniform cutting characteristics are provided due to the mower's ability to closely accommodate itself to the terrain being cut.

An additional object of the invention is to provide a riding lawn mower having a rotary cutting blade wherein the cutting blade and blade housing is interposed between the front and rear portions of the mower frame and is partially supported upon the front portion in a trailing relationship, and means are provided whereby changes in the vertical plane by the front frame portion relative to the rear frame portion are directly transmitted to the blade housing.

Another object of the invention is to provide a riding lawn mower having a blade housing mounted thereon wherein the blade housing may be selectively moved toward and away from an engine drive pulley to tension a drive belt for rotating the cutting blade. Means are provided for maintaining the belt in engagement with the blade pulley at all times such that upon release of the tension within the belt, the belt and blade pulley remain in contact and the belt serves to "brake" the rotation of the blade pulley and blade once the blade pulley is "declutched" from the engine.

An additional object of the invention is to provide a riding lawn mower having a drive axle and drive wheels mounted upon opposite ends of the axle. The mower engine is adapted to power a transmission which in turn rotates a differential casing mounted upon the drive axle. The differential casing is mounted immediately adjacent one of the drive wheels whereby the hub portion of the drive wheel constitutes a portion of the differential casing and an economical differential drive is provided.

These and other objects of the invention arising from the details and relationships of components thereof will be apparent from the following description and accompanying drawings wherein:

FIG. 1 is a perspective view of a riding lawn mower in accord with the invention taken from the front right side thereof, FIG. 2 is a perspective view of the mower taken from the rear left side thereof, FIG. 3 is a bottom view of a mower in accord with the invention, portions of the blade housing being cut away for purpose of illustration, FIG. 4 is an enlarged detail elevational sectional view of the transmission and means driving the differential casing as taken along section IV—IV of FIG. 8, FIG. 5 is an elevational view of the mower frame, per se.

Figure 9:
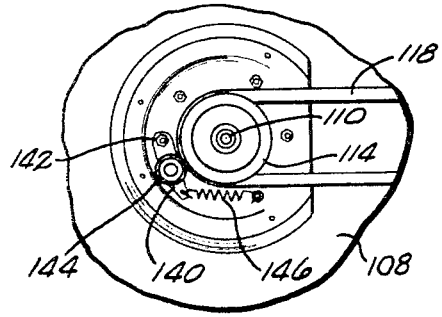
Figure 6:
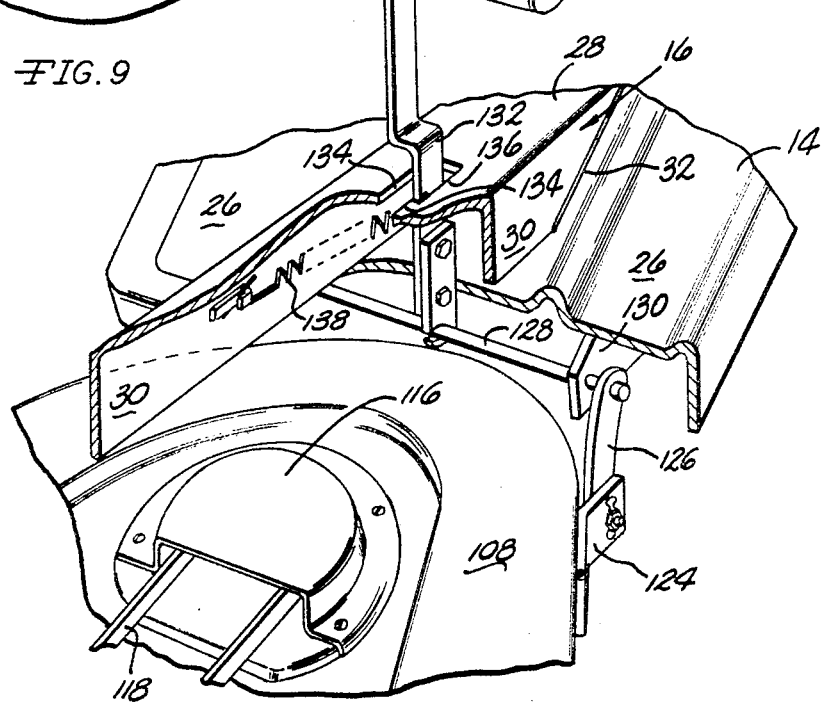

FIG. 6 is an enlarged detail perspective view of the frame central and front portions, a portion thereof being cut away for purpose of illustration and illustrating the blade housing lever located within the notch formed in the frame central portion, FIG. 7 is an elevational sectional view taken through the central frame portion along section VII—VII of FIG. 1, FIG. 8 is a detail enlarged diametrical sectional view taken through the differential employed with the mower of the invention, and FIG. 9 is a detail plan view of the blade housing, blade shaft, and blade pulley, the outer blade cover being removed for purpose of illustration.

With reference to FIGS. 1 and 2 the arrangement of the basic components of a riding lawn mower in accord with the invention will be appreciated. The mower includes a frame generally indicated at 10 and this frame includes a rear portion 12, a front portion 14, and an elongated central portion 16 connected to the front and rear portions at its ends. The frame portions are preferably formed of pressed sheet steel. The rear portion 12 is depressed at 18 forming a well in which an engine 20 of the vertical crankshaft type is mounted. The engine includes a drive shaft 22, FIG. 3, which extends below the well 18, and includes a double groove drive pulley 24, mounted thereon.

The front frame portion 14 includes a pair of foot rest portions 26 and understructure permitting attachment of the steerable wheels and the blade housing thereto, as later described.

The elongated central frame portion 16 is formed of sheet metal and is of an inverted channel shaped configuration as will be apparent from FIG. 7. The channel includes a planar base portion 28 having longitudinal edge portions from which depend leg portions 30. The leg portions 30 are shaped at their ends to conform to the configuration of the front and rear portions engaged thereby and the central portion is preferably affixed at its ends to the front and rear frame portions by welding beads 32. Thus, the frame 10 is fabricated into an integral unit.

The seat 34 is mounted upon a formed sheet metal pedestal 36 which is affixed upon the end of the central portion attached to the rear frame portion.

A drive axle 38 extends transversely across the rear frame portion 12 and is rotatably mounted thereon by bearings 40. The drive axle 38 is of an uninterrupted configuration throughout its length and includes a drive wheel 42 affixed to one end of the axle. The other drive wheel 44 is rotatably mounted upon the other end of the drive axle in a manner which will be later described.

A pair of steerable front wheels 46 are mounted upon the front portion 14 upon conventional pivots and bearings. By means of linkages 48 the wheels 46 are connected to a steering shaft 50 extended vertically through the front frame portion having a steering handle 52 attached at the upper end which is disposed in front of the seat 34 and readily accessible to the operator.

A transmission 54 is mounted upon the rear frame portion 12 below the seat 34 and includes a vertical input shaft 56, FIG. 4, having a pulley 58 attached thereto. The transmission 54 includes gearing operated by a shiftable control lever 60 whereby the output shaft 62 may be controlled to rotate in either a forward or reverse direction. The output shaft has a chain sprocket 63 attached thereto.

Clutching of the transmission 54 to the engine 20 is controlled by a foot pedal 64, FIG. 1, pivotally mounted upon the front frame portion. Through suitable linkage means, not shown, the foot pedal 64 is adapted to axially translate an extension control rod 66, FIG. 3, extending through the central frame portion 16 to the rear frame portion. The foot pedal extension rod 66 is completely located within the central frame portion 16 and is hidden from view. The extension rod 66 is connected to a lever 68, FIG. 3, pivotally mounted upon the frame portion 12. The lever 68 includes an idler pulley 70 having a V-groove for receiving the belt 72. As apparent from FIG. 3, the belt 72 passes about a groove in the engine pulley 24, the transmission input pulley 58, and the idler pulley 70 mounted upon the lever 68. Depressing the foot pedal 64 pivots the lever 68 in a direction which causes the idler pulley 70 to tighten the belt 72 and, thus, establish a driving connection between the engine pulley 24 and the transmission input pulley 58. A spring 74 tends to bias the lever 68 in a direction which will release the tension on the belt 72 and upon the operator removing his foot from the pedal the tension on the belt is removed to "declutch" the transmission from the engine.

Automatic braking means for the mower are provided and include a lever 76 pivotally mounted on the underside of well 18 by a pivot pin 78. The lever 76 includes a downwardly depending arcuate flange which is in alignment with the pulley 58 and the belt 72 received therein. The lever 76 is biased by spring 84 to normally maintain the flange 80 in frictional engagement with the back of the belt 72 and pulley 58. However, when foot pedal 64 is depressed the end 82 of extension rod 66, which is connected to lever 68, engages lever 76 and moves the flange 80 away from the pulley 58. When the pedal 64 is in the normal nondepressed position, the spring 84 biases the flange 80 into engagement with belt 72 and restrains the pulley 58, input shaft 56 and output shaft 62 from rotation. Thus, due to the connection of the shaft 62 to the mower drive wheels, the mower is automatically braked when the belt 72 is not tensioned, yet the frictional engagement of the flange 80 and belt 72 is removed when the belt is tensioned. The flange 80 also serves to prevent the belt 72 from dropping out of the groove of pulley 58 when the belt tension is released.

With reference to FIG. 8, it will be appreciated that a differential housing 86 is rotatably mounted upon the drive axle 38 by means of a bearing 88. The differential housing 86 is mounted adjacent to the hub portion 90 of the drive wheel 44. A chain sprocket 92 is mounted upon the differential housing whereby the chain 94 establishes a driving connection between the transmission output shaft 62 and the differential housing. A side gear 96 is keyed to the drive axle 38 and the side gear meshes with a pinion gear 98 rotatably mounted upon the differential housing 86 and having an axis of rotation perpendicularly disposed to the longitudinal axis of the axle. The drive wheel 44 is rotatably mounted upon the axle 38 by a bearing 100 and a side gear 102 is connected to the hub 90 as to be integral therewith and concentrically related to the axle. The side gear 102 also meshes with the pinion gear 98 on the opposite side thereof with respect to the side gear 96.

The hub 90 includes a circular recess 104 into which is rotatably received the circular open end 106 of the differential housing 86. In this manner the hub 90 encloses one end of the differential housing. While the relationship between the circular recess 104 and the open end 106 of the differential housing is not a sealed relationship, the clearance between these components is relatively small whereby a heavy lubricant placed within the housing 86 is retained within the housing and grass and foreign matter cannot enter the differential housing. It will, therefore, be appreciated that by locating the differential housing 86 adjacent the drive wheel 44 whereby the drive wheel forms a portion of the differential housing, and by locating the side gear 102 directly upon the wheel hub, an economical, yet effective, differential driving action can be established between the drive wheels 42 and 44 which permits the mower to turn in a shorter radius than is possible if a differential is not employed between the transmission and the axle.

A rotary cutting blade housing 108 is located between the front wheels 46 and the rear wheels 42 and 44, as will be apparent from FIGS. 1 through 3. The blade housing 108 is preferably formed of a pressed steel construction and includes antifriction bearings, not shown, whereby a shaft 110, FIG. 3, disposed in a vertical manner may be rotatably supported on the blade housing. A cutting blade 112, FIG. 3, is affixed to the lower end of the shaft 110 in a conventional manner. The upper end of the shaft 110 extends above the blade housing and is provided with a belt pulley 114, FIG. 9, affixed thereto. A cover 116 is removably affixed to the housing 108 to enclose the pulley 114 and a belt 118 extends around the pulley 114 from the cover to the engine pulley 24 for transmitting rotation of the engine pulley to the blade 112. The housing 108 includes an outlet opening 120, FIG. 1, for the grass cuttings and the rear portion of the housing is supported upon a pair of small wheels 122 rotatably mounted upon the blade housing. Adjustment means are provided, not shown, wherein the wheels 122 may be adjusted in a vertical manner relative to the blade housing.

At the front the blade housing is provided with a pair of brackets 124 having a plurality of holes defined therein whereby the brackets may be selectively attached to levers 126 pivotally mounted upon the frame front portion 14 for rotation about an axis represented by shaft 128. By selective adjustment of the levers 126 relative to bracket 124 the vertical relationship between the front of the blade housing 108 and the front frame portion 14 may be adjusted.

The shaft 128 is pivotally mounted upon the front portion 14 on brackets 130 and a handle 132 is affixed to the shaft 128 and extends through a slot 134 defined in the base portion 28 of the central frame portion 16. The handle 132 is formed in two parts interconnected by bolts to permit assembly of the handle within the slot 134. The slot 134 extends in a longitudinal direction whereby the handle 132 may be pivoted in a longitudinal direction back and forth and thereby move the blade housing 108 toward and away from the engine 20. This movement selectively tensions and slackens the belt 118 to clutch and declutch the blade to the engine. A notch 136, FIG. 6, is defined in the base portion 28 of the central frame portion communicating with the slot 134 whereby a slight transverse movement of the handle 132 permits the handle to be received within the notch. When the handle is in the notch 136, the blade housing 108 will be moved its maximum degree towards the engine 20 to declutch the blade from the engine. A spring 138 interposed between the central frame portion 16 and the handle 132, FIG. 6, tends to bias the handle in a rearward direction and upon removing the handle from the notch 136 the spring will pivot the handle 132 and levers 126 in the direction which moves the housing 108 forwardly and tensions the belt to power the blade from the engine.

With reference to FIG. 9, the means for "braking" the blade shaft 110 against rotation will be appreciated. A small lever 140 is pivotally mounted upon the blade housing adjacent the pulley 114. The lever 140 pivots about the pin 142 and supports a roller 144 which is mounted upon antifriction bearing means, and rotates about an axis parallel to the shaft 110. A spring 146 biases the lever 140 in a counterclockwise direction maintaining engagement of the roller with the belt 118 and thus biases the engaged portion of the belt toward the pulley 114 and shaft 110. Due to the action of the spring 146 the roller 144 will always be in engagement with the belt 118 regardless of the degree of tension existing within the belt. Thus, when the belt is tensioned to establish a driving connection between the engine and the blade the roller will engage the belt in the manner shown in FIG. 9. Upon the handle 132 being moved forwardly to move the blade housing toward the engine 20 the belt becomes slack. However, as the roller 144 will maintain that portion of the belt directly interposed between the roller and the shaft in engagement with the pulley 114 a frictional relationship exists between the belt and pulley even though the tension in the belt has been released. As the belt is no longer being rotated by the engine the inertia forces tending to rotate the blade after it has been declutched from the engine will rotate the pulley 114 and the energy required to move the belt when disengaged from the engine pulley 24 is sufficient to quickly dissipate the kinetic energy resulting from the inertia of the rotating blade and the blade 112 will cease rotation within several seconds. Thus, the engagement of the roller 144 with the belt 118 to maintain a frictional connection between the belt and the pulley 114 at all times serves to effectively "brake" the blade against rotation upon its being disconnected from the engine. However, the roller 144 will not produce adverse frictional forces on the belt or pulley 114 when the blade is clutched to the engine.

The cross-sectional configuration of the central frame portion 16 provides a high strength resistance to the central frame portion bending or deflecting in a vertical plane, yet permits a significant degree of twisting or flexing of the central frame portion about the longitudinal axis of the central frame portion. The natural resiliency of the sheet metal steel from which the central frame portion is formed has sufficient resistance to flexing to prevent being flexed beyond its yield point, under normal operating conditions, yet is capable of permitting sufficient degree of flexing to permit all of the wheels supporting the mower to remain in engagement with the type of irregular terrain which is normally encountered in many lawns. Thus, the front wheels 46 can accurately follow the terrain being traversed and the blade housing and blade will be properly oriented to the terrain being cut.

The inverted configuration of the channel comprising the central frame portion permits the control extension rod 66 to be shielded from view and an engine throttle lever 148 may be mounted upon the base portion 28 in the manner apparent from FIG. 7 to provide convenient access to the operator, and yet form an attractive unitary appearance. Likewise, the formation of the slot 134 and the notch 136 in the base portion 28 permits the blade housing operation handle 132 to be located in a readily accessible position.

It will be appreciated that the central frame portion 16 permits a riding lawn mower frame to be fabricated which may be formed in an integral manner of sheet metal and yet is capable of sufficient flexing to permit the grass cutting means to closely follow the contour of the terrain. As the central frame portion 16 is integral with the front portion 14 and rear portion 12 a unitary construction, which minimizes noise, assembly problems, wear, and the like is provided.

It is appreciated that modifications to the inventive concept may be apparent to those skilled in the art without departing from the spirit and scope of the invention and it is intended that the invention be defined only by the following claims.

We claim:

1. A riding lawn mower comprising, in combination, a frame, said frame including a rear portion, a front portion and a central, elongated torsion portion having a longitudinal axis interconnecting said front and rear portions, drive ground wheels rotatably mounted on said rear portion defining a first axle axis, steerable ground wheels rotatably mounted on said front portion defining a second axle axis rigidly fixed with respect to said front portion, an engine mounted on said rear portion adapted to be drivingly connected to said drive ground wheels, steering means connected to said steerable wheels, a seat mounted upon said frame, grass cutting means connected to said frame, said elongated central frame portion comprising a torsion member having a front end rigidly connected to said front frame portion and a rear end rigidly connected to said rear frame portion, said elongated central frame portion being relatively slender and resiliently flexible so as to permit angular flexing and twisting about its longitudinal axis when one of said axle axes tilts in a vertical plane relative to the other axle axis and thereby tending to maintain engagement of said wheels with irregular terrain.

2. In a riding lawn mower as in claim I, wherein said grass cutting means is connected to and partially supported by said front frame portion, whereby said steerable wheels at least partially determine the orientation of said grass cutting means to the terrain being traversed.

3. In a riding lawn mower as in claim 1, wherein said central elongated frame portion is sheet metal and is of a channel shaped cross-section having a base portion having longitudinal extending edges and a leg portion depending from each edge, said leg portions extending in a common direction from said base portion.

4. In a riding lawn mower as in claim 3, wherein said central elongated frame portion is disposed in an inverted manner wherein said leg portions extend downward with respect to said base portion, an engine clutch control member mounted on said front frame portion having a movably operated portion defined thereon, and a control member extension longitudinally extending through said central frame portion below said base portion intermediate said leg portions to said rear frame portion.

5. In a riding lawn mower as in claim 3, wherein said grass cutting means is located between said front and rear frame portions below said central frame portion, said grass cutting means including a first pulley, a second pulley mounted upon said engine, a belt interposed between said pulleys, lever means mounting said grass cutting means upon said front frame portion permitting said grass cutting means and first pulley to be moved toward and away from said second pulley to selectively tighten and loosen said belt, a handle defined on said lever, a slot defined in said central frame portion base portion, said handle extending through said slot, and a handle retaining notch defined in said base portion communicating with said slot adapted to receive and retain said handle to maintain said lever in a predetermined position.

References Cited
UNITED STATES PATENTS

| | | | |
|---|---|---|---|
| 339,697 | 4/1886 | Roncaglia | 74—242.8 |
| 2,346,756 | 4/1944 | Hoppe | 188—83 |
| 2,795,914 | 6/1957 | Smith | 56—25.4 |
| 2,924,928 | 2/1960 | Rhoades et al. | 56—25.4 |
| 2,945,338 | 7/1960 | Burrows et al. | 56—25.4 |
| 2,972,850 | 2/1961 | Ariens et al. | 56—25.4 |

RUSSELL R. KINSEY, Primary Examiner